United States Patent [19]
Rogers

[11] Patent Number: 6,119,976
[45] Date of Patent: Sep. 19, 2000

[54] SHOULDER LAUNCHED UNMANNED RECONNAISSANCE SYSTEM

[76] Inventor: Michael E. Rogers, 4105 Graham-Newton Rd., Raleigh, N.C. 27606

[21] Appl. No.: 09/013,551

[22] Filed: Jan. 27, 1998

Related U.S. Application Data

[60] Provisional application No. 60/036,792, Jan. 31, 1997.
[51] Int. Cl.$^7$ ...................................................... B64C 3/56
[52] U.S. Cl. .............................. 244/13; 244/49; 244/190; 89/1.816
[58] Field of Search ................................. 244/49, 13, 46, 244/124, 190, 3.27, 3.28, 3.29; 89/1.815, 1.816, 1.819

[56] References Cited

U.S. PATENT DOCUMENTS

| | | | |
|---|---|---|---|
| 3,564,134 | 2/1971 | Rue et al. | 244/190 |
| 4,364,531 | 12/1982 | Knoski | 244/49 |
| 4,410,151 | 10/1983 | Hoppner et al. | 244/49 |
| 4,869,441 | 9/1989 | Steuer | 244/49 |
| 4,923,143 | 5/1990 | Steuer et al. | 244/49 |

*Primary Examiner*—Galen L. Barefoot
*Attorney, Agent, or Firm*—Mills Law Firm PLLC

[57] ABSTRACT

A shoulder launched unmanned reconnaissance system for providing overhead visual surveillance of remote targets is disclosed. The present system includes a reconnaissance air vehicle which may be fired from a portable launcher, accelerated to flight speed, and remotely controlled using a ground control system. The vehicle is flown to the target area to enable an onboard wide angle video system to transmit video images of the target by radio or fiber optics link to the ground control system for processing and display. The ground control system enables the reconnaissance vehicle to be flown to a recovery area and to descend in a stall mode after the flight is completed for maintenance prior to reuse. The air vehicle includes collapsible wings which are deployable after launch by a spring actuated mechanism. The fuselage of the air vehicle carries an onboard video camera, an electric motor, a battery, a global positioning system receiver, flight controls, and a data link system.

In an alternative embodiment, the fuselage of the air vehicle includes a storage bay with a rotary mechanism capable of deploying sensors for chemical and biological warfare agents or other dropable payloads such as dye markers for marking fleeing motor vehicles. The present system is capable of conducting overhead surveillance up to a range of approximately 10 kilometers.

13 Claims, 7 Drawing Sheets

SHOULDER LAUNCHED UNMANNED RECONNAISSANCE SYSTEM

CROSS-REFERENCE TO RELATED APPLICATION

This Application claims the benefit under 37 U.S.C. 119(e) of United States Provisional Application No. 60/036,792 filed on Jan. 31, 1997 by Michael E. Rogers for Shoulder Launched Unmanned Reconnaissance System.

BACKGROUND OF INVENTION

1. Field of Invention

This invention relates to unmanned air reconnaissance vehicles and, more particularly, to a shoulder launched unmanned reconnaissance system for providing visual reconnaissance and intelligence support to front line troops.

Despite the utilization of high technology line-of-sight sensor systems, front line infantry still face major problems conducting close in reconnaissance. Often the only way to find whether an enemy is around the next bend in a road, over the next hill, or in the next urban block is to physically enter the area and expose ground troops to ambush or attack. Thus, military ground troops need a very close in reconnaissance method to minimize their exposure while increasing their area of surveillance.

Such a reconnaissance system could also be used by law enforcement agencies for surveillance of high crime areas, tracking suspects on foot, and allowing police to track and intercept a fleeing vehicle without dangerous high speed chases that endanger innocent bystanders.

Similarly, such a visual reconnaissance system could be utilized by various security agencies to extend the view of ground patrol personnel to observe suspected criminal activity.

Thus, the Shoulder Launched Unmanned Reconnaissance System (SLURS) of the present invention has been developed to provide front line troops and other forces with overhead visual surveillance of enemy locations up to a range of about 10 kilometers.

2. Description of Related Prior Art

U.S. Pat. No. 4,869,441 to Ralmar Steuer discloses an ammunition missile with extendable glide wings which are pivotally retained in attachments which are arranged generally in parallel with the longitudinal axis of the missile on the casing of the fuselge of the missile, and which are equipped with longitudinal grooves each respectively stowing a retracted wing.

U.S. Pat. No. 4,586,681 to Larry D. Wedertz et al. discloses an erectable wing structure for a supersonic air frame that is stowable within the body of the airframe including a housing defining an elongated cavity in which is mounted a wing supporting strut assembly having an elongated edge strut pivoted at one within the stowable cavity.

U.S. Pat. No. 5,474,257 to Jeffrey A. Fisher discloses a deployable wing comprising an internal structure having diverging leading edge spars attached to a keel spar and cross spars to form a delta wing configuration.

U.S. Pat. No. 3,990,656 to Violet C. Minnich discloses a pop-up fin construction for small missiles that includes two members that are pivotally secured together at one end with the other end of one of the members being pivotally secured to a structure and the other end of the other member being slideably mounted on a rod with tension springs biasing the two members together to form a generally triangular shape of a fin.

U.S. Pat. No. 4,351,499 to Inge Maudel et al discloses a retractable, self-erecting wing for a low speed missile, having a double walled fabric body held in extended position by spring loaded struts, the fabric enclosing an air pocket which acts as a damper to prevent the wing from fluttering under certain aerodynamic conditions.

U.S. Pat. No. 4,691,880 to Arthur M. Frank discloses a torsion spring powered missile wing deployment system including an overcenter linkage powered by a torsion assembly capable of exerting a generally linear bias on the linkage over its full range of motion. A separate lock linkage maintains the foldable wing in a deployed position until a release actuation of the lock linkage occurs enabling wing deployment.

U.S. Pat. No. 4,149,166 to Fay E. Null discloses a Doppler decoy protection device comprising a missile capable of being launched from a space craft whose protection is sought, and to travel in advance thereof and at a speed greater than the speed of said space craft, guide means extendable rearwardly from said missile, Doppler decoy means slidable on said guide means for simulating the Doppler characteristics of the craft whose protection is sought.

Finally, U.S. Pat. No. 4,135,686 Eugen Herpfer discloses a device for starting rocket-driven missiles whose flight course is directed opposite the flight course of a carrier aircraft, which includes aerodynamically-acting braking means adapted to be extended from a position of low resistance to a position of higher resistance, and means for separating the braking means from the rocket-driven missile upon completion of the braking operation.

SUMMARY OF THE INVENTION

After much research and study of the above described problems, the present invention has been developed to provide a portable unmanned reconnaissance system including an air vehicle to provide military and law enforcement personnel with overhead visual surveillance of a close in target to a range of about 10 kilometers.

The present Shoulder Launched Unmanned Reconnaissance System includes a Reconnaissance Air Vehicle which may be fired from a portable launcher, accelerated to flight speed, and remotely controlled using a ground control system.

The Reconnaissance Air Vehicle is flown to the target area to enable an on-board wide angle video system to transmit video images of the target by radio or fiber optics link to the ground control system for processing and display.

The ground control system enables the Reconnaissance Air Vehicle to be flown to a recovery area and to descend in a stall mode after the flight is complete.

After recovery, the air vehicle is serviced as required, the deployable wings are refolded and the device is reinserted into the launcher for reuse.

In view of the above, it is an object of the present invention to provide a Shoulder Launched Unmanned Reconnaissance System for providing overhead surveillance of close in targets up to a range of about 10 kilometers.

Another object of the present invention is to provide a Reconnaissance Air Vehicle having deployable wings which unfold in flight to permit the control thereof by an operator using a remote ground control system.

Another object of the present invention is to provide a Reconnaissance Air Vehicle capable of carrying an on-board video system for the transmission of video images of the target area by radio or fiber optics link for video processing and display to an operator at a remote location.

Another object of the present invention is to provide a Reconnaissance Air Vehicle which can be conveniently carried by law enforcement and military personnel and fired from a portable launcher from a user's shoulder, or in the alternative, from the ground surface by remote control.

Another object of the present invention is to provide a Reconnaissance Air Vehicle which can be flown to a recovery area after the surveillance flight is complete and recovered for repeated use.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
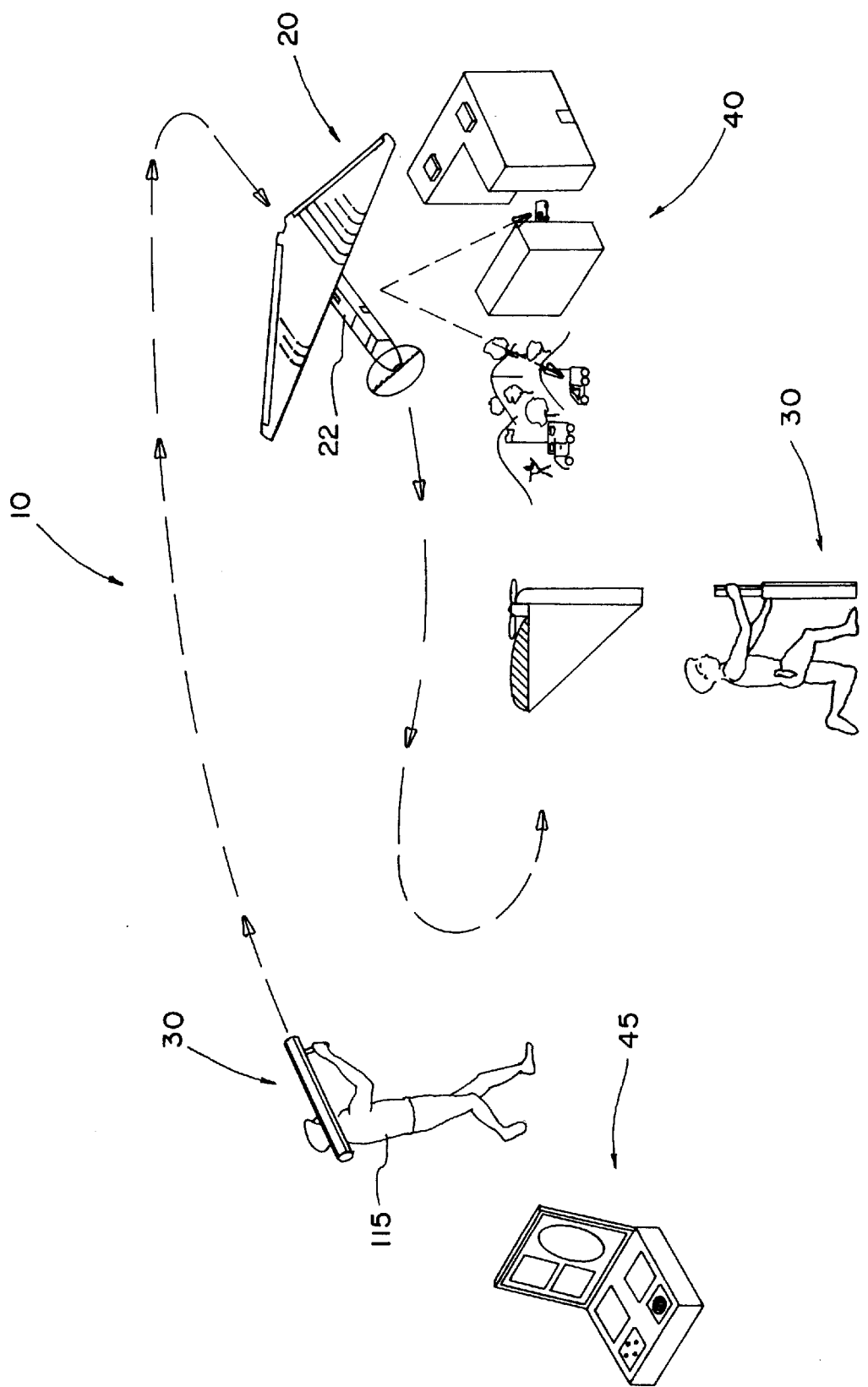
FIG. 1 is a composite view showing the overall concept and operational stages of the shoulder launched unmanned reconnaissance system of the present invention.

With reference to the drawings there is shown therein an illustration of the operational concept of the Shoulder Launched Unmanned Reconnaissance System (hereinafter SLURS) of the present invention indicated generally at 10 and shown in FIG. 1.

In an overview of the operational sequence, the SLURS Reconnaissance Air Vehicle (hereinafter RAV), indicated generally at 20 is aimed upwardly by the operator 115 and ejected from the portable launcher 30.

In the alternative the (RAV) may be fired from a portable groundbased launcher (not shown) of the type having multiple support legs either manually or by remote control.

In the preferred embodiment, the launch mechanism for the portable launcher 30 is a pneumatic or hydraulic cylinder, but springs or pyrotechnic propulsion may also be utilized to launch the (RAV).

Since such launching mechanisms are well known to those skilled in the art, further detailed discussion of the same is not deemed necessary.

The (RAV) 20 accelerates to flight speed, the wings unfold, and the (RAV) flies away under the control of the operator 115 using the ground control system 45 (hereinafter GCS).

The (RAV) is flown to the target area, indicated generally at 40, and the on-board wide angle video system transmits video images of the target area 40 by radio or fiberoptics link to the (GCS) 45 for video processing and display.

The (GCS) 45 includes (RAV) controls which permit the operator 115 to direct the (RAV) to a recovery area after flight is complete. The operator 115 sends a signal which stops the (RAV's) motor 21 and the RAV descends in a stall mode.

Thereafter the (RAV) is recovered, the battery and/or fiberoptic reel is replaced, the wings of the (RAV) are refolded, and the RAV is reinserted into the launcher 30 for re-use.

The major sub-systems of the (SLURS) of the present invention will now be described in further detail. The Reconnaissance Air Vehicle (RAV) is capable of providing reconnaissance to a range of up to 10 kilometers. The fuselage 22 carries on board a video camera, electric motor, battery, Global Positioning System (GPS) receiver, autopilot, flight controls, and a data link system.

Figure 2:
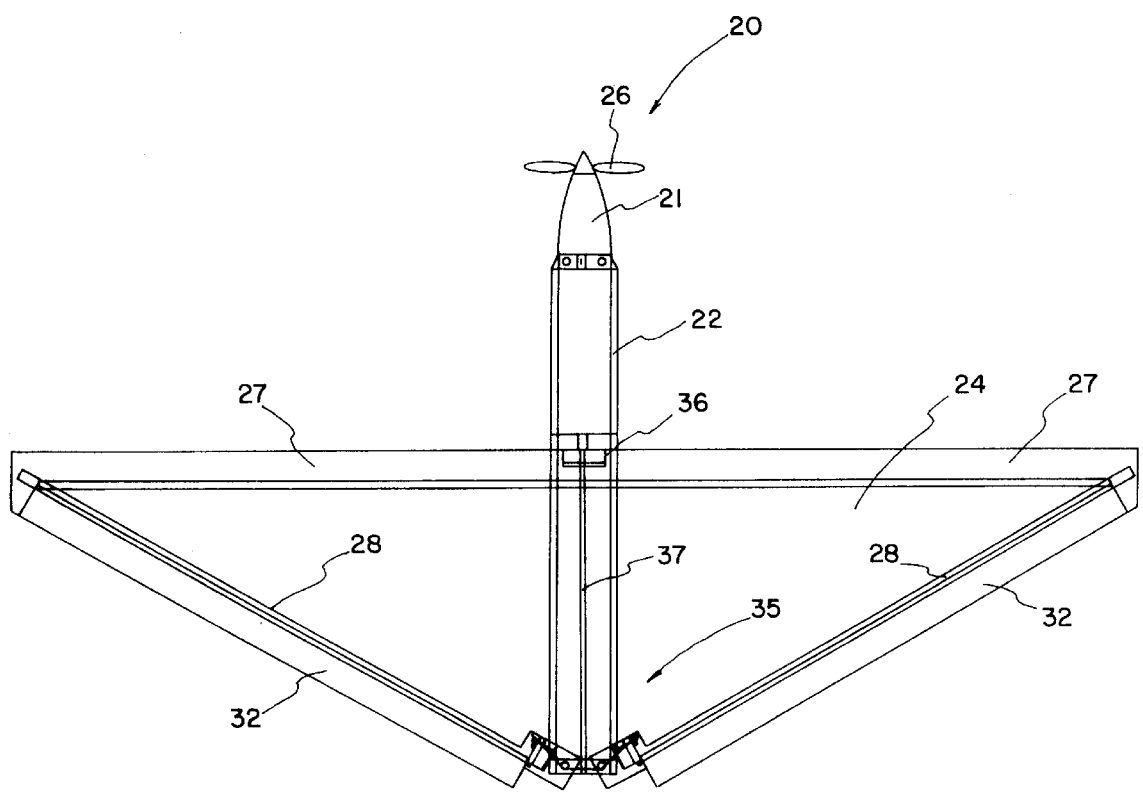
FIG. 2 is a plan view of the Reconnaissance Air Vehicle of the present invention showing the deployable wings thereof in an unfolded configuration.

As more clearly shown in FIG. 2 the (RAV) 20 weighs only ten pounds having a six foot wing span. The prelaunch stowed volume is 42 inches by 5 inches. The speed ranges from 25 miles per hour (stall) to 60 miles per hour (structural limit). (RAV) endurance on a rechargeable battery package 23 is thirty minutes with an additional one hour capacity possible on non-rechargeable batteries.

The (RAV) features a U-shaped fuselage 22 up to 50 inches in length with a flat top 22a to support the wing deployment mechanism, indicated generally at 35, and to provide a smooth aerodynamic joint between the fuselage 22 and the lower surface of the wing 24. The entire flat top 22a of the fuselage is removable for easy access to the components contained therein, which simplifies maintenance tasks and reduces down time for repairs.

Figure 8A:
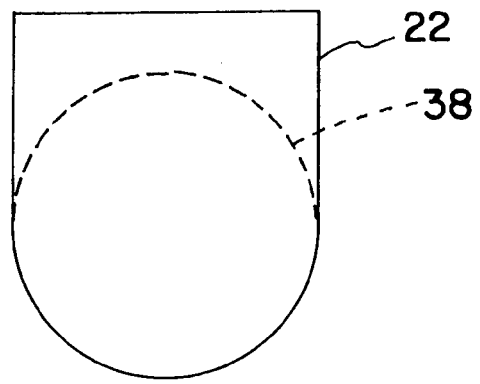
FIG. 8A is a schematic cross-sectional view through the fuselage of the Reconnaissance Air Vehicle showing a sensor stored therein.
Figure 8B:
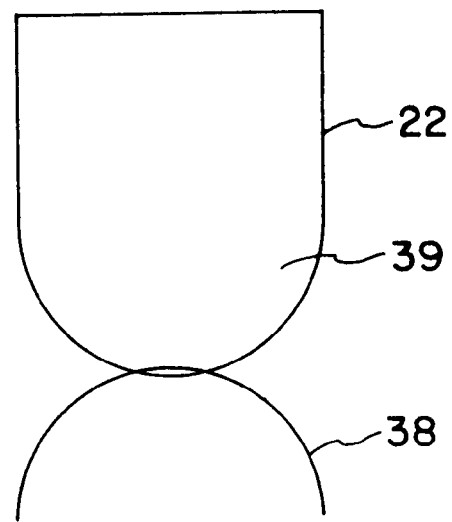
FIG. 8B is a schematic cross-sectional view of the fuselage of the Reconnaissance Air Vehicle showing the sensor of FIG. 8A in a deployed condition.

In the preferred embodiment the fuselage 22 includes a bay 39 as shown in FIGS. 8A and 8B located at the center of gravity which is utilized to carry and/or deploy various items such as sensors, or other packages. The bay 39 is provided with a rotary mechanism to minimize structural problems associated with the construction of such a bay.

A geared, brushless electric motor 21 drives the large folding propeller 26 for maximum efficiency. The (RAV) motor 21 can be stopped in flight to permit the aircraft to glide and conserve battery power, which causes the propeller 26 to fold back to minimize drag.

Since the wing 24, particularly the fabric covering, is the component most susceptible to damage, the wing assembly is designed to be easily replaced. The entire wing assembly including the wings 24, the wing deployment mechanism 35, and servo controls 31, is attached so it can be easily and quickly removed from the fuselage 22 as a unit.

Figure 3:
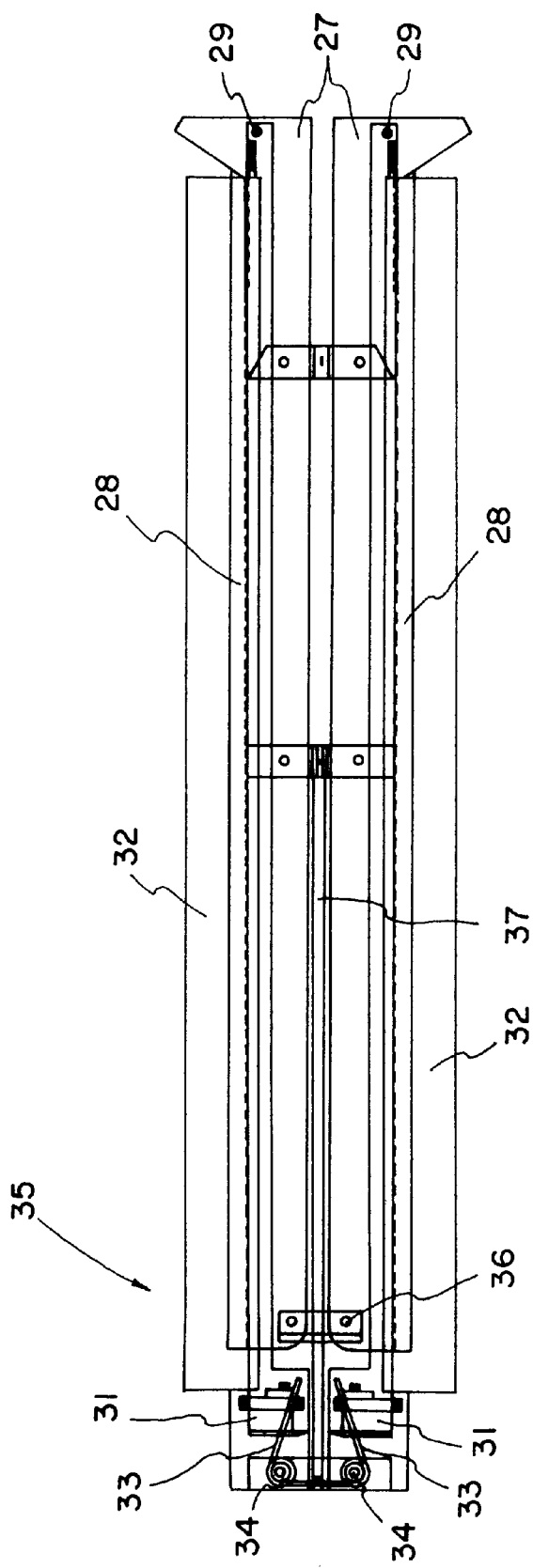
FIG. 3 is a plan view showing the Reconnaissance Air Vehicle with the deployable wings thereof in a folded condition.

A critical feature of the (RAV) 20 is the wing deployment mechanism 35 as more clearly shown in FIG. 3. The folded front spars 27 are positioned inboard of the rear spars 28 on the top of the fuselage 22 in a folded condition as shown in FIG. 3. It can be seen that the outboard tips of front spars 27 are pivotally attached to wing tip plates as at 29, which also connect to the outboard tips of the rear spars 28.

The front spars 27 are larger and deeper than the rear spars 28 allowing the rear spars to nest inside the front spars in a folded condition as shown in FIG. 3. The difference in depth between the rear spars 28 and the front spars 27 provides storage volume for the wing fabric in the folded condition.

A plurality of servos 31 located in the wing roots drive the large, elongated elevons 32 mounted on the trailing edge of the rear spars 28 to provide both pitch and roll control of the (RAV). This design feature eliminates mechanical linkages from the fuselage 22 to the wing 24 requiring only power and control wires (not shown) leading through the wing root to the servos 31.

Figure 5A:
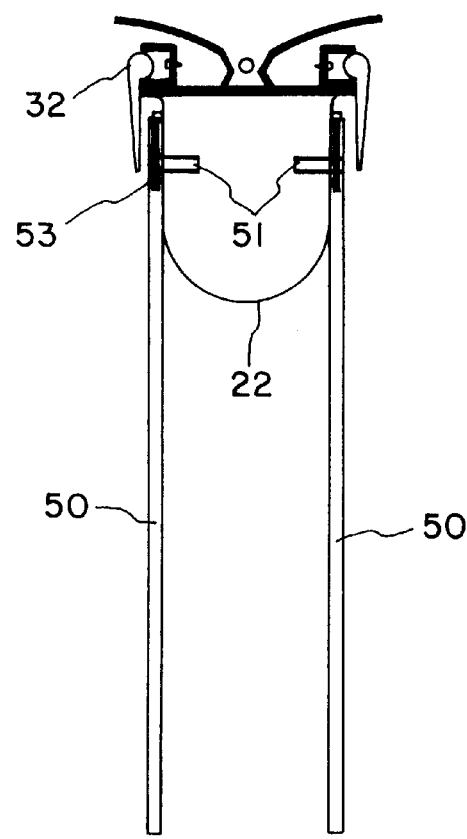
FIG. 5A is an end view of the fuselage of the Reconnaissance Air Vehicle showing a pair of ventral fins in their deployed position.
Figure 5B:
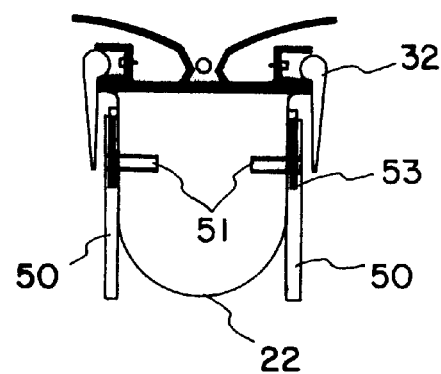
FIG. 5B is an end view of the fuselage of the Reconnaissance Air Vehicle showing the pair of ventral fins of FIG. 5A in a folded condition.

To minimize the (RAV) volume in a folded condition, the elevons 32 are folded against the sides of the fuselage 22 prior to launch as most clearly shown in FIG. 5B.

After launching the elevons 32 rotate upwardly during wing deployment to align themselves with the trailing edge of the wing as shown in FIG. 2.

During wing deployment the rear spars 28 are pivoted outwardly by a plurality of torsion springs 33 disposed in the wing roots as shown in FIG. 3 and mechanically coupled to the rear spars 28, which initiate the unfolding process. The rear spars 28 rotate outwardly about their respective pivot points as at 34 on the outboard edge of the fuselage 22 pulling the front spars 27 forward and outboard as described hereinafter in further detail.

The centerpiece 36 connecting the front spars 27 slides on a center rod 37 allowing the front spars 27 to move forward while simultaneously rotating outwardly. As the wing deployment continues the centerpiece 36 is pulled forward by a spring (not shown), which draws the wing fabric taut. Once the front spars 27 are drawn forward to their functional position shown in FIG. 2, the spring tension prevents the front spars from sliding rearwardly under aerodynamic loads.

During flight in order to achieve stability in an aircraft such as the (RAV) without a tail or canard surface, reverse camber must be built into the wing to counteract the cordwise aerodynamic moments. Thus, during flight the full span elevons 32 of the (RAV) are trimmed a few degrees upwardly in order to achieve stability during flight without having to build reverse camber into the wing structure. The outboard portion of the elevons 32 function primarily as ailerons since their lateral moment arm is large, but their pitching moment arm is very small.

It will be appreciated by those skilled in the art that the elevons can be modified to various other configurations (not shown) or can be deleted entirely if additional control surfaces such as control fins are provided. In addition, the necessary reverse camber can be built into the wing structure if desired.

It will be noted that although FIG. 2 shows the front spars 27 being perpendicular in relation to longitudinal axis of the fuselage 22, the wing deployment mechanism 25 can be arranged so that front spars 27 are disposed at an acute angle to the fuselage 22 resulting in a forward swept wing configuration (not shown). This configuration may be preferable in order to change the center of gravity of the (RAV) 20 or for other reasons.

In yet another alternative embodiment the wing deployment mechanism 35 can be arranged such that the front spars 27 are attached at the outboard pivot points 34 with the hinge points positioned toward the front of the fuselage 22. In this arrangement the rear spars 28 nest inboard of the front spars 27 in a folded condition such that the rear spars 28 are attached to the center rod 37 during wing deployment. This configuration of the (RAV) 20 results in a so-called delta wing aircraft (not illustrated).

Figure 4:
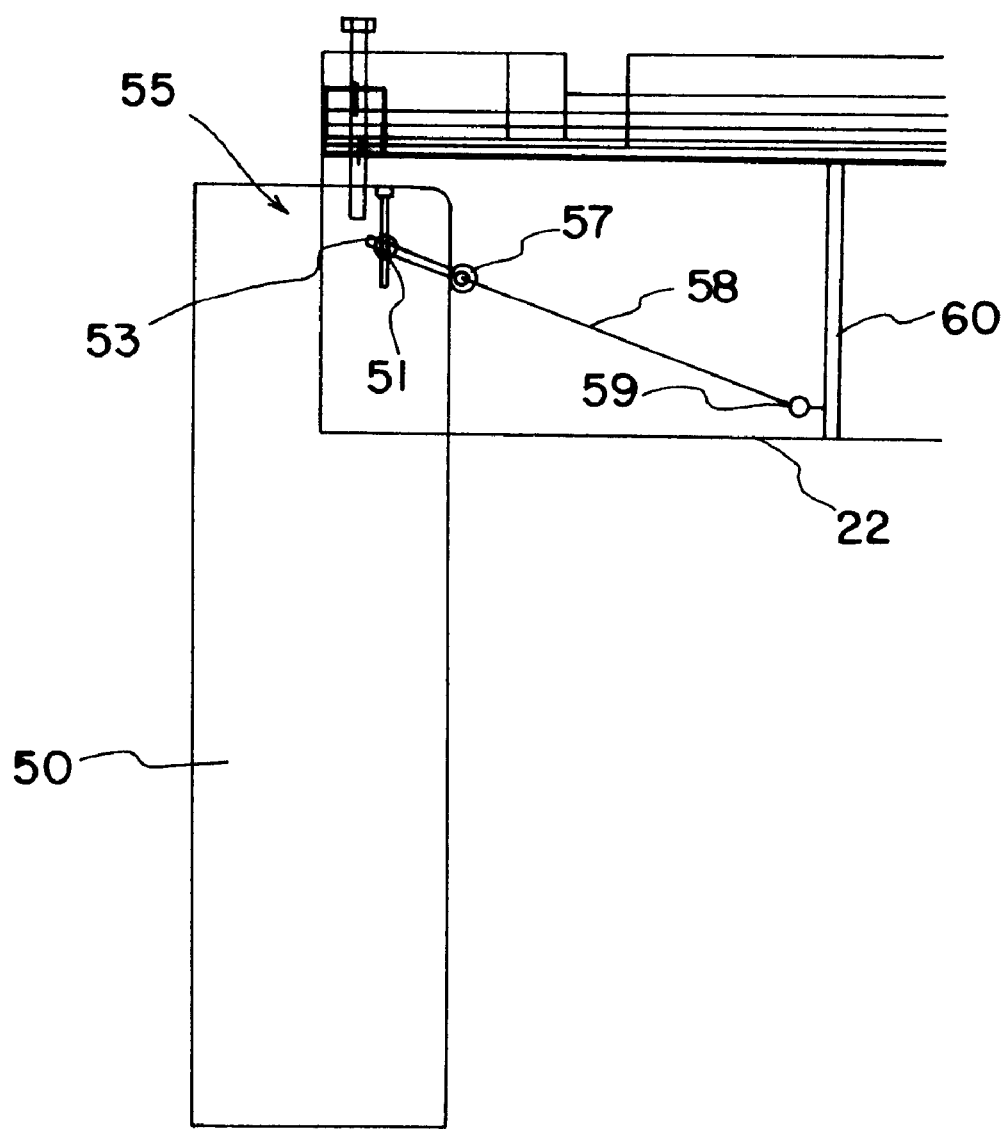
FIG. 4 is an enlarged side elevational view of a ventral fin of the Reconnaissance Air Vehicle and its associated fin deployment mechanism.

The (RAV) 20 is provided with at least one ventral fin 50 including an associated fin deployment mechanism, indicated generally at 55, as shown in FIG. 4.

In the preferred embodiment a pair of ventral fins 50 are pivotally mounted on either side of the fuselage 22 as more clearly shown in Fig. 5A wherein fins 50 are shown deployed and in FIG. 5B wherein fins 50 are folded upwardly along the sides of the fuselage 22 in a prelaunch condition.

After launch the fins 50 are rotated downwardly into their flight position by the fin deployment mechanism 55. This mechanism includes a torsion spring 53 being mechanically coupled in functional relation to pivot pins 51. The springs 53 function to rotate the fins 50 downwardly after launch to the position shown in FIG. 4. However, spring tension is designed to permit the fins 50 to deflect aft during landing and recovery to prevent the (RAV) 20 from cartwheeling to a crash landing.

Of course various other spring mechanisms such as the inclusion of integral springs at the pivot point may be utilized to effect the downward rotation of fins 50.

In an alternative embodiment (not shown) the fins 50 may pivot relative to a vertical center plane of the fuselage to form an inverted or upright V in cross-section. This fin configuration is accomplished by locating the pivot pins 51 on the curved portion of the side of the fuselage 22 or by the use of a cam (not shown) at the pivot point to divert the fin 50 away from the fuselage 22 at an acute angle.

In addition, the fins 50 may include control surfaces or may be "all-moving" control surfaces in addition to or in lieu of the elevons 32 as described hereinabove.

Still referring to FIG. 4, it can be seen that spring 53 incorporates a loop connector 57 which is adapted to receive a retaining wire or cable 58 at one end thereof and being anchored at an opposite end thereof as at 59 to a structural member 60 of the fuselage 22.

Wire 58 is of a predetermined length to control the downward rotation of fin 50 to a desired position to provide optimal flight characteristics.

Figure 6:
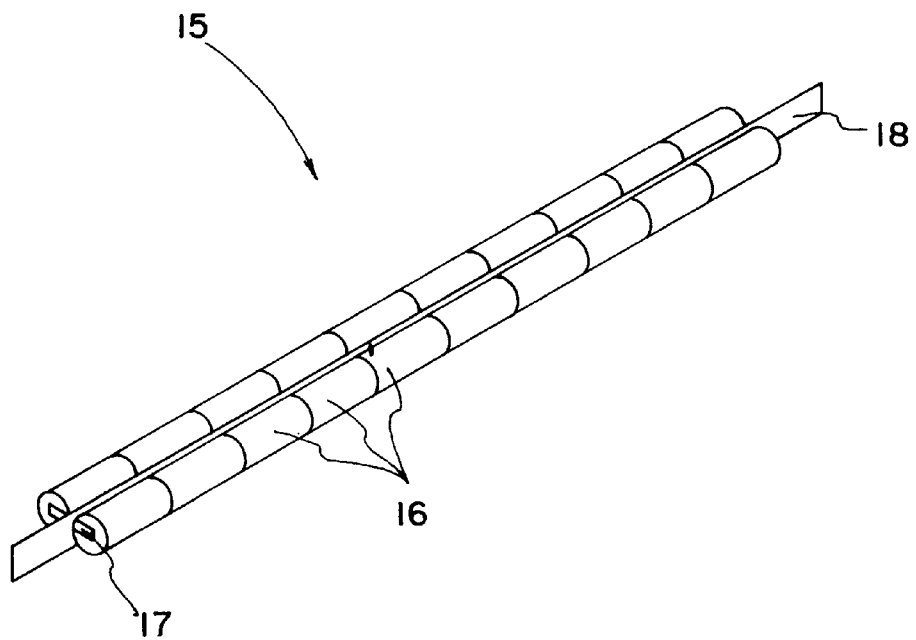
FIG. 6 is a perspective view of the battery pack of the present invention showing a plurality of individual batteries arranged in end-to-end relation.

Primary power for the (RAV) is provided by a 2 kilogram (4.4 pound) battery pack, indicated generally at 15, configured in two parallel cylinders of a plurality of individual C or D cells 16. The individual battery cells 16 are placed end-to-end in series with a cross connection 17 at the end of one cylinder to the other as shown in FIG. 6.

The primary power take off is a 28.8 volt heavy duty connector (not shown) to support the large motor current loads at the forward or primary end. A connector ( not shown) at the opposite or secondary end of the battery pack provides 14.4 volt power for other onboard equipment.

The battery cells 16 are preferably a rechargeable nickel-cadmium or nickel-metal hydride type which are used for training and normal operational missions. In addition, non-rechargeable lithium-sodium dioxide batteries may be used for longer duration missions to provide an hour or more of operation.

Figure 7:
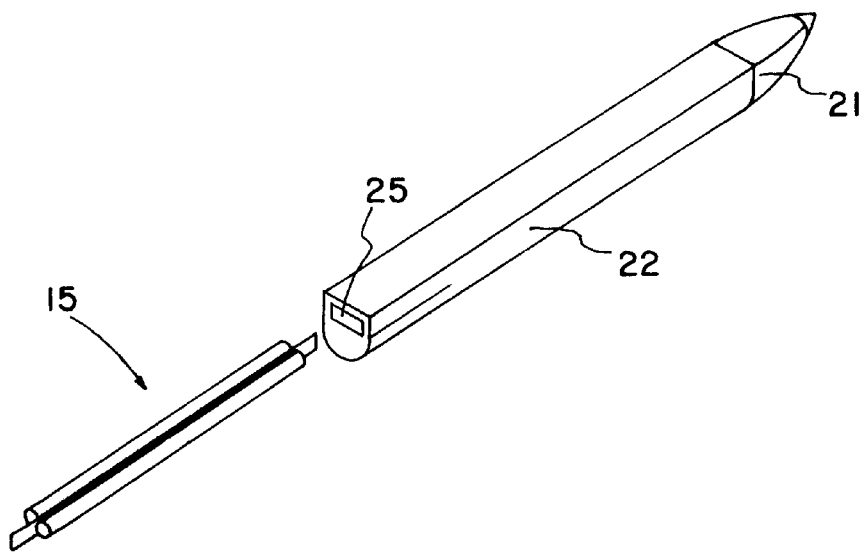
FIG. 7 is an exploded perspective view of the fuselage of the Reconnaissance Air Vehicle together with the battery pack of FIG. 6 being inserted therein.

A fiberglass rib member 18 disposed between the two rows of battery cells 16 reinforces the battery pack 15 and supports the power connectors to provide a positive contact with the onboard (RAV) wiring system when the battery pack 15 is inserted into the fuselage as shown in FIG. 7. A key way or slot on the rib 18 prevents installing the battery pack 15 with incorrect polarity.

The assembled battery pack 15 slides into the fuselage 22 through a rear opening 25 therein to permit efficient replacement of a battery pack 15 between flights and does not require opening the fuselage 22 for access during inclement weather.

During flight the (RAV's) low light video camera image is transmitted to the ground control system (GCS) and displayed to the operator. A key feature in making the (SLURS) of the present invention feasible is the OMNI-VIEW wide angle video system that transforms any portion of the recorded image from a 180° fisheye lens into normal undistorted images produced by conventional cameras. The (RAV) is capable of carrying muliple cameras including a mixture of color and black and white for increased low light capability.

Since such wide angle video systems are well known to those skilled in the art, further detailed discussion of the same is not deemed necessary.

In addition to the video camera system, the (RAV) is capable of carrying additional sensors 38 that require exposure to the external environment such as sensors to detect chemical and biological warfare agents and other contaminents. The fuselage bay 39 being provided with a rotary deployment mechanism can rotate to expose such sensors without releasing them to obtain chemical data and, thereafter, rotate the sensors 38 inwardly into the bay of the fuselage to preserve samples for later analysis as shown in FIGS. 8A and 8B.

Further, the fuselage bay is capable of carrying dropable payloads including ground sensor packages, jamming equipment, and dye markers (not shown) for police marking of fleeing vehicles.

Using the (GCS), the (RAV's) auto-pilot can fly it in pre-programmed patterns without constant attention, permitting the operator to maintain radio silence except when passing new flight directions to the (RAV).

In practical use the operator does not have to "fly" the (RAV) using a small "joy stick" on the (GCS) except during launch and recovery. For the remainder of the mission the operator can program in waypoints and altitude and the auto-pilot will use the (GPS) information to fly the desired patterns. The (GCS) calculates the (RAV's) relative bearing, range, and altitude through comparison with the (GPS) signal. The (GCS) includes interfaces to record the video for later intelligence view or to relay the video immediately to higher echelons.

The (GCS) design for civilian users and for some military users such as rear area security forces will be approximately the same size, but slightly heavier, than a lap top computer. For infantry use an even smaller (GCS) consisting of a small hand held controller and a backpack radio transceiver/video processor is contemplated.

Multiple (GCS) units can receive the (RAV) video/radio down link. So-called Individual Observer Units (IOU's) are provided with only the video receiver, processor and display units of the full blown (GCS) described hereinabove. Thus, soldiers in different locations can each look at any part of the total video transmission. For example, in a situation where a patrol is entering a village, one soldier might utilize an (IOU) to determine whether an enemy was around a corner of a building while another soldier utilizing a separate (IOU) could be looking for infiltraters on the other side of the village.

The (SLURS) of the present invention includes related auxiliary equipment to support its use in a particular application. For example, the (SLURS) may be carried in a flexible pouch (not shown) to permit the system to be carried by military personnel in the field. In addition, the entire (SLURS) can be contained in a waterproof, pressurized tube to permit underwater carriage by Navy SEAL teams and other special operations personnel.

Since such carrying equipment is well known to those skilled in the art, further detailed discussion of the same is not deemed necessary.

From the above, it can be seen that the (SLURS) of the present invention provides a practical and cost effective reconnaissance system for front line infantry. The relatively simple video system combined with the folding wing and compact fuselage permits the (RAV) to be light enough to be carried and operated by one individual.

The launcher protects the (RAV) prior to launch, eliminates carrying cases, and permits launch of the (RAV) from confined spaces.

Further, interchangeable radio and fiberoptic control in the (RAV) provide maximum versatility including flights with no radio transmission at all. In addition, the use of the (RAV) auto-pilot and pre-programmed flight profiles reduces the operator's work load.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An unmanned reconnaissance system for surveying a remote location, comprising: a portable elongated launch cylinder having an internal cylindrical cavity therein; a launch vehicle telescopically slidably disposable in said cavity; means coacting between said launch cylinder and said launch vehicle for ejecting said launch vehicle from said cavity of said launch cylinder, said launch vehicle including an elongated fuselage having a front end and a rear end, collapsible propeller means operatively carried at said front end of said fuselage, power means for operating said propeller means to propel said launch vehicle after said launch vehicle is ejected from said launch cylinder, a pair of collapsible wings carried on said fuselage between said front end and said rear end, each of said wings comprising a rear spar rotatably connected at an inner end to an outboard portion of said rear end of said fuselage at a first pivotal connection, a front spar rotatably connected at an inner end to said fuselage at a longitudinally slidable second pivotal connection located transversely between said first pivotal connections, said second pivotal connection having a pre-launch position adjacent said first pivotal connection and a post-launch position toward said front end of said fuselage, first biasing means for longitudinally shifting said second pivotal connection, from said pre-launch position to said post-launch position, second biasing means for rotating said rear spar outwardly of said fuselage, a third pivotal connection rotatably connecting outer ends of said front spar and said rear spar whereby in said pre-launch condition said rear spar and said front spar are in overlapping relationship along said fuselage, a foldable lightweight material interconnecting said front spar and said rear spar and establishing an airfoil surface in said post-launch condition, fin means pivotally carried on a lower surface of said fuselage and biased downwardly from said fuselage in said post-launch condition, camera means carried on said fuselage for providing video signals regarding said remote location, and operator controlled transceiver means for controlling said propeller means for establishing a flight path for said vehicle toward said remote location and for receiving said video signals from said camera means.

2. The unmanned reconnaissance system as recited in claim 1 wherein elongated pivotally variable elevons are rotatable carried on the trailing edge or said rear spar for effecting pitch and roll control of said launch vehicle.

3. The unmanned reconnaissance system as recited in claim 2 wherein said elevons are controlled by electromechanical servos carried on said fuselage.

4. The unmanned reconnaissance system as recited in claim 3 wherein said fuselage includes a storage bay for carrying a payload.

5. The unmanned reconnaissance system as recited in claim 4 wherein said payload comprises sensors for chemical and biological agents.

6. The unmanned reconnaissance system as recited in claim 5 wherein said payload comprises ground sensor packages and dye markers for marking said remote location and means responsive to said operator controlled transceiver means for ejecting said payload from said storage bay.

7. The unmanned reconnaissance system as recited in claim 3 wherein said means coacting between said launch cylinder and said launch vehicle is a pneumatic/hydraulic.

8. The unmanned reconnaissance system as recited in claim 3 wherein said means coacting between said launch cylinder and said launch vehicle is a pyrotechnic device.

9. The unmanned reconnaissance system as recited in claim 3 wherein said camera means includes color and black and white cameras for increased low-light capability.

10. The unmanned reconnaissance system as recited in claim 3 wherein said front spar is positioned transverse to said fuselage in said post-launch condition.

11. The unmanned reconnaissance system as recited in claim 3 wherein said propeller means are operatively connected to an electric motor.

12. The unmanned reconnaissance system as recited in claim 11 wherein said electric motor is powered by battery means removably carried in said fuselage.

13. An unmanned launch vehicle for surveying a remote location, comprising: an elongated fuselage having a longitudinal axis; propeller means operatively carried at a forward end of said fuselage; power means for operating said propeller means to propel said launch toward said remote location, foldable wing means carried on said fuselage having a first spar rotatably connected at an inner end to an outboard portion of the end of said fuselage at a first pivotal connection; a second spar rotatably connected at an inner end to said fuselage at a second pivotal connection longitudinally slidable with respect to said longitudinal axis, said second pivotal connection having a pre-launch position adjacent said first pivotal connection and a post-launch position remote therefrom; first biasing means for longitudinally shifting said second pivotal connection from said pre-launch position to said post-launch position; second biasing means for rotating said first spar outwardly of said fuselage, a third pivotal connection rotatably connecting outer ends of said first spar and said second spar whereby in said pre-launch condition said first spar and said second spar are in spaced relationship along the sides of said fuselage and in said post-launch condition said first spar, said second spar and said fuselage define a generally triangular shape; and a foldable lightweight material interconnecting said spars and establishing an airfoil surface in said post-launch condition.

\* \* \* \* \*